United States Patent
Hall et al.

(10) Patent No.: US 10,199,981 B2
(45) Date of Patent: Feb. 5, 2019

(54) SYSTEM, METHOD, AND APPARATUS FOR HIGH SPEED OPERATION

(71) Applicant: Won-Door Corporation, Salt Lake City, UT (US)

(72) Inventors: Duane O. Hall, Sandy, UT (US); E. Carl Goodman, Salt Lake City, UT (US); William Michael Coleman, Salt Lake City, UT (US)

(73) Assignee: Won-Door Corporation, Salt Lake City, UT (US)

( * ) Notice: Subject to any disclaimer, the term of this patent is extended or adjusted under 35 U.S.C. 154(b) by 0 days.

(21) Appl. No.: 15/383,498

(22) Filed: Dec. 19, 2016

(65) Prior Publication Data
US 2018/0175780 A1 Jun. 21, 2018

(51) Int. Cl.
*H02P 29/40* (2016.01)
*H02P 3/06* (2006.01)
*E05F 15/605* (2015.01)
*E06B 3/94* (2006.01)
*E06B 3/48* (2006.01)

(52) U.S. Cl.
CPC ............ *H02P 29/40* (2016.02); *E05F 15/605* (2015.01); *E06B 3/481* (2013.01); *H02P 3/06* (2013.01); *E05Y 2201/434* (2013.01); *E05Y 2400/44* (2013.01); *E05Y 2900/142* (2013.01)

(58) Field of Classification Search
CPC .... H02P 29/032; H02P 29/40; H02P 2205/01; H02H 7/08
See application file for complete search history.

(56) References Cited

U.S. PATENT DOCUMENTS

| | | | |
|---|---|---|---|
| 6,662,848 B2 | 12/2003 | Goodman et al. | |
| 7,190,132 B2 | 3/2007 | Goodman et al. | |
| 8,115,427 B2 | 2/2012 | Banta et al. | |
| 8,253,362 B2* | 8/2012 | Sakamoto | B62D 5/0481 318/434 |
| 8,278,862 B2 | 10/2012 | Coleman et al. | |
| 8,376,020 B2 | 2/2013 | Smart | |
| 8,692,493 B2* | 4/2014 | Hall | H02P 7/2913 318/400.01 |
| 9,151,103 B2 | 10/2015 | Hall et al. | |
| 2010/0214709 A1* | 8/2010 | Hall | H02H 7/0816 361/93.9 |
| 2011/0005689 A1* | 1/2011 | Coleman | H02H 7/0851 160/84.02 |
| 2014/0265983 A1* | 9/2014 | Eisenbeis | H02P 29/02 318/490 |
| 2016/0006387 A1* | 1/2016 | Nakamura | H02P 29/032 701/43 |
| 2017/0063073 A1* | 3/2017 | Friedman | H02H 3/087 |

* cited by examiner

*Primary Examiner* — Eduardo Colon Santana
*Assistant Examiner* — Said Bouziane
(74) *Attorney, Agent, or Firm* — TraskBritt

(57) ABSTRACT

A motor control system comprises a motor control circuit, a non-transitory storage medium and a processing circuitry. The storage medium is configured to store a current threshold profile that is indicative of a current requirement of the motor control circuit for an operational cycle of a motor. The processing circuitry is configured to adjust the stored current threshold profile based on a change to the operational cycle of the motor (e.g., from standard to non-standard).

18 Claims, 10 Drawing Sheets

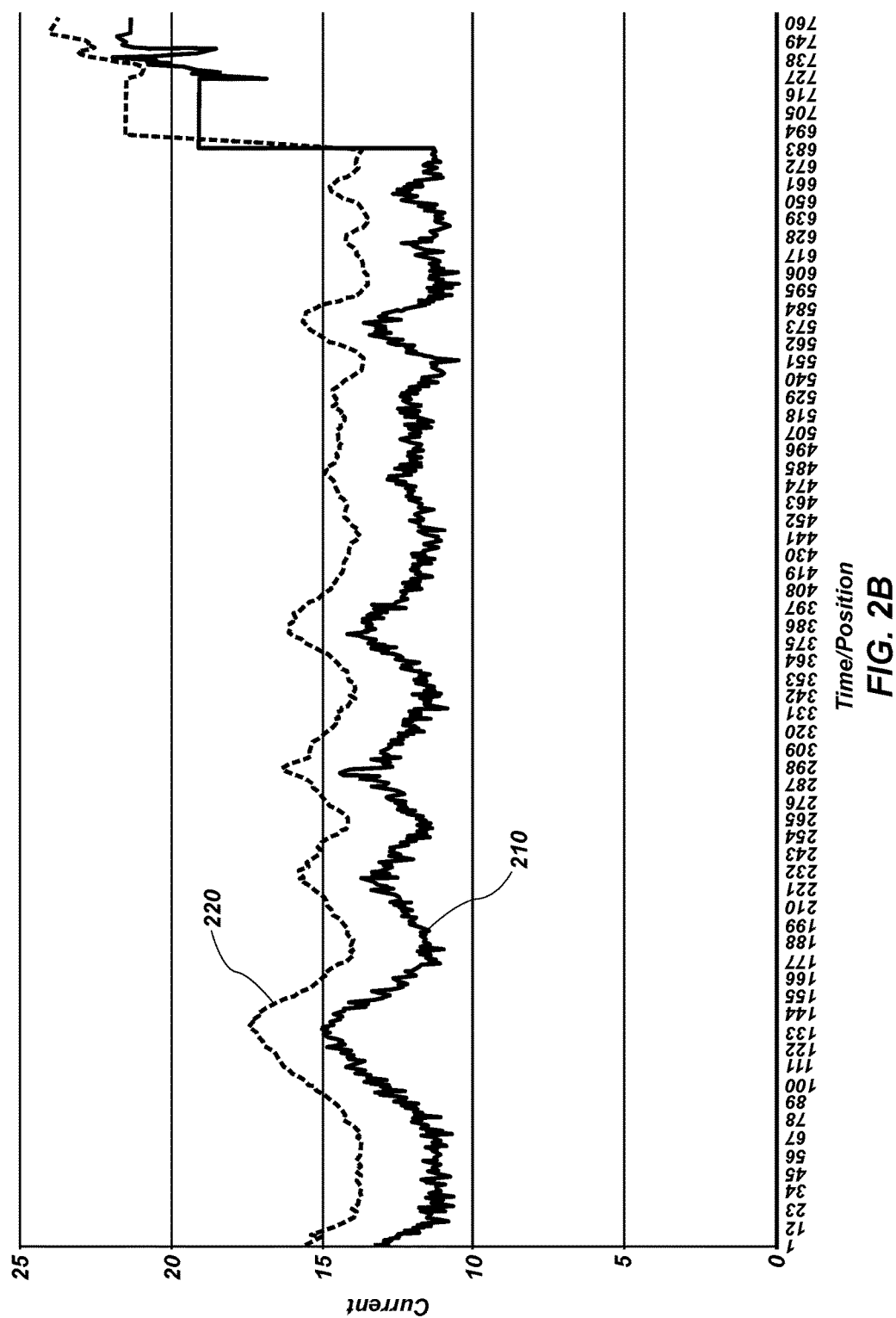

SYSTEM, METHOD, AND APPARATUS FOR HIGH SPEED OPERATION

TECHNICAL FIELD

Embodiments of the present disclosure relate generally to motor control systems. In particular, various embodiments of the present disclosure relate to motor control systems for detecting current requirements of an electrical load and to foldable partitions employing such motor control systems.

BACKGROUND

Control circuits and systems for controlling an electrical load, such as an electric motor, and a movable device driven thereby are numerous and varied in their operation. Some such systems may control the operation of the electric motor and/or the movable device, others may provide over current protection for deactivating the motor based on excess current to the electric motor, while others may provide various combinations of features.

One example of such a motor and movable device employing control circuits includes conventional automatic doors. Such doors are implemented in various configurations such as, for example, sliding doors, rotating panel doors, folding doors, and revolving doors. Automatic doors are often relied on for security and fire safety purposes. These automatic door systems often include various sensors and switches to assist in the control of the doors, including detecting obstructions or anomalous operation.

For example, a conventional automatic door, when used as a fire door, may include a switch or actuator in a lead post for detecting an obstruction of the door while the door is closing, which may indicate a person trying to pass by the door when it is closing.

In other automatic doors, the current to a motor controller and/or motor may be monitored for unusual or atypical requirements. Unusual or atypical requirements may indicate an obstruction. To determine what is unusual, some control systems compare a current profile for normal operation to current measurements during operation of a door to identify discrepancies.

If an obstruction is detected, the movable door's operation may be changed or adjusted to respond to the obstruction. Operating according to an obstruction response routine may in turn affect current requirements for the control system and therefore the reliability of obstruction detection that relies on a comparison with a profile based on standard operation.

The prior art may have other disadvantages, limitations, or unaddressed needs.

There is a need, therefore, for a control system that will smoothly operate a door in the event of an obstruction while maintaining its ability to detect and respond to legitimate obstructive events.

BRIEF SUMMARY

Various embodiments of the present disclosure comprise control systems, doors and related methods for controlling an electrical load, such as a motor, to detect anomalous operational activities. Such anomalous activities may include detecting an obstruction to the electrical load.

One or more embodiments of the disclosure include motor control systems. In one or more embodiments, the motor control system may comprise a motor control circuit, a non-transitory storage medium and processing circuitry. The non-transitory storage medium may be configured to store a first current threshold profile that is indicative of a first current requirement of the motor control circuit for a first operational cycle of a motor. The processing circuitry may be configured to adjust the first current threshold profile based on a change to the operational cycle of the motor.

Other embodiments comprise methods of monitoring the operation of an electric motor. One or more embodiments of such methods may comprise adjusting a first current threshold profile based on a change to an operational cycle of a motor. The first current threshold profile may correspond to the un-changed operational cycle of the electric motor. The adjusted current threshold profile may be compared to a signal, where the signal is proportional to a current requirement to operate the electric motor during the changed operational cycle. An error signal may be generated if the current requirement exceeds the adjusted current threshold profile.

In yet additional embodiments, the present disclosure includes motor controlled folding partitions. In various embodiments, a motor controlled folding partition may comprise a plurality of panels. Each panel of the plurality of panels may be hingedly coupled with an adjacent panel of the plurality of panels. A lead post may be attached to at least one panel of the plurality of panels and a trolley coupled to the lead post. A drive may comprise a transmission member coupled to the trolley and a motor configured to drive the transmission member. A control system may be operably coupled to the motor. The control system may be configured to control the motor according to a first operational mode and monitor operation of the motor based on a profile indicative of the first operational mode. Based on a result from monitoring operation of the motor based on the first profile, the control system may control the motor according to a second operational mode, and monitor the operation of the motor based on a second profile indicative of the second operational mode.

Still other embodiments comprise methods of profiling current requirements of an electric motor. One or more embodiments of such methods may comprise selecting a plurality of sample points on a current profile. Current values for the plurality of sample points may be averaged. A multiplier may be determined for each of the plurality of sample points based on an expected load. A modifier may be determined for each of the plurality of sample points based on at least the multipliers and the average current value. The current values for the plurality of sample points may be adjusted based on the modifiers.

The foregoing and other features and advantages of the embodiments will be made more apparent from the descriptions, drawings and claims that follow.

BRIEF DESCRIPTION OF THE DRAWINGS

FIG. 2B illustrates the operation profile of FIG. 2A with the corresponding threshold profile.

DETAILED DESCRIPTION

The illustrations presented herein are, in some instances, not actual views of any particular foldable partition or motor control system, but are merely idealized representations that are employed to describe the present invention. Additionally, elements common between figures may retain the same numerical designation.

In the following detailed description, circuits and functions may be shown in block diagram form in order not to obscure the present invention in unnecessary detail. Additionally, block definitions and partitioning of logic between various blocks as depicted is non-limiting, and may comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or both.

In the following description, certain terminology is used to describe certain features of one or more embodiments of the invention. For instance, the term "bus" refers to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
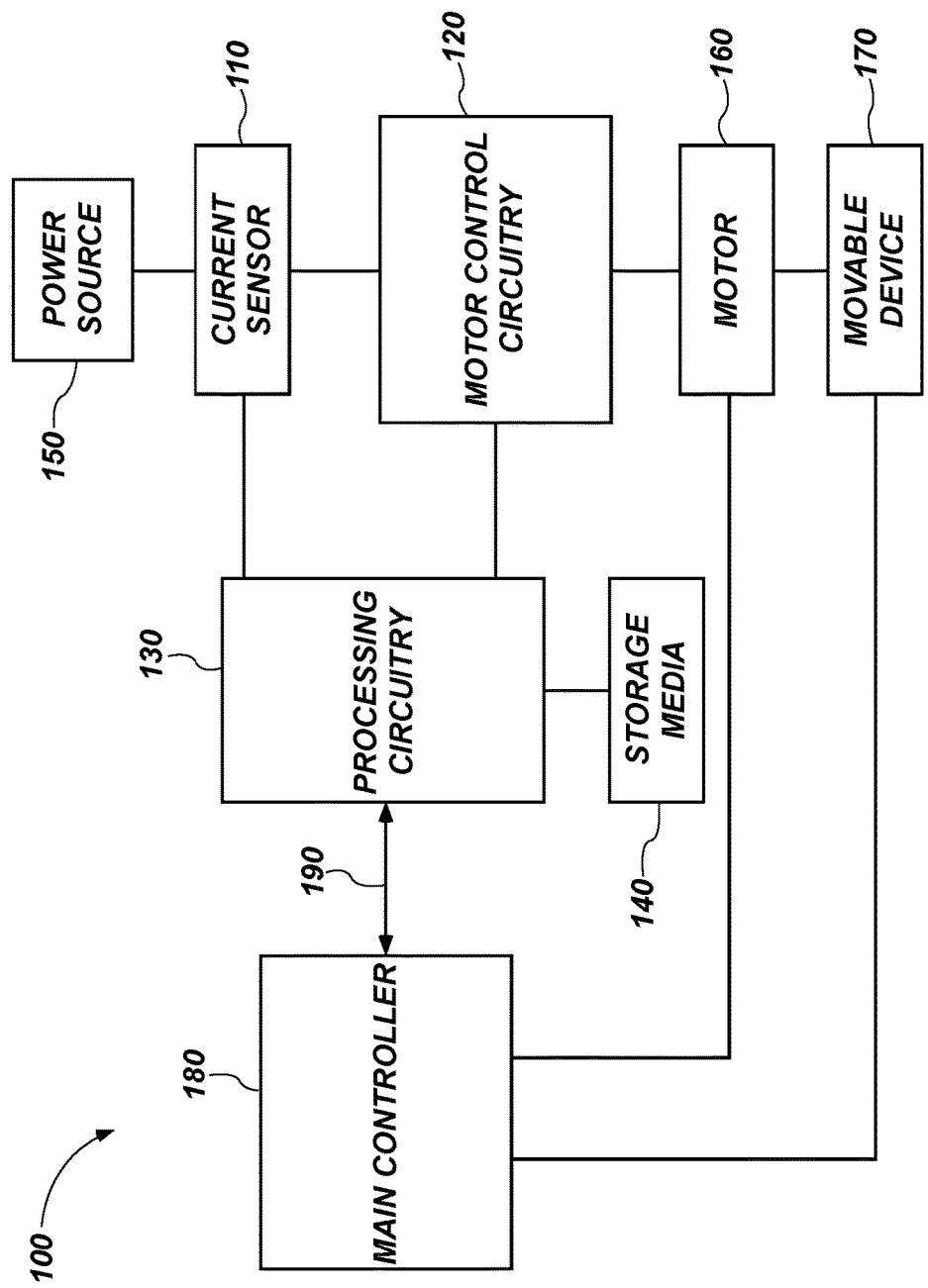
FIG. 1 is a block diagram illustrating a motor control system in accordance with at least one embodiment of the present disclosure.

Various embodiments of the present invention comprise motor control systems for controlling one or more motors in association with a variety of applications. FIG. 1 illustrates a motor control system 100 in accordance with at least one embodiment of the present disclosure. The motor control system 100 may be configured to monitor an operational cycle of a load and dynamically adjust a threshold current value of the motor control system 100 in accordance with the operational cycle of the load. Moreover, the motor control system 100 may be configured to stop the operation of the load in the event a current supplied to the load exceeds the threshold current value. The motor control system 100 may comprise a current sensor 110 operably coupled to a motor control circuit 120, both of which are operably coupled to processing circuitry 130, and storage media 140 accessible by the processing circuitry 130.

The current sensor 110 is coupled to a power source 150 configured to provide power to the motor control circuit 120. The current sensor 110 may comprise any current sensor suitable for generating an analog or digital signal, wherein the signal is proportional to the amount of current flowing through current sensor 110. A current sensor 110 that is configured to generate an analog signal may be coupled to an analog-to-digital converter to sample the input and convert it to a digital value suitable for use by the processing circuitry 130. The analog-to-digital convertor may comprise a stand-alone analog-to-digital converter coupled between the current sensor 110 and the processing circuitry 130 or an analog-to-digital converter included in the processing circuitry 130. A current sensor that is configured to generate a digital signal may directly interface to the processing circuitry 130 to present a digital value suitable for use by the processing circuitry 130. By way of example only, and not by way of limitation, the current sensor 110 may comprise a conventional Hall Effect current sensor, as will be understood by a person having ordinary skill in the art.

The processing circuitry 130 is arranged to obtain, process data, send data, control data access and storage, issue commands, and control other desired operations. Processing circuitry 130 may comprise circuitry configured to implement desired programming provided by appropriate media in at least one embodiment. For example, the processing circuitry 130 may be implemented as one or more of a processor, a controller, a plurality of processors and/or other structure configured to execute executable instructions including, for example, software and/or firmware instructions, and/or hardware circuitry. Embodiments of processing circuitry 130 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor but, in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. These examples of processing circuitry 130 are for illustration and other suitable configurations within the scope of the invention are also contemplated.

The methods or algorithms described in connection with the examples disclosed herein may be embodied directly in hardware, in firmware, in a software module executable by the processing circuitry 130, or in a combination thereof, in the form of a processing unit, programming instructions, or other directions, and may be contained in a single device or distributed across multiple devices. The storage media 140 is configured to store programming such as executable code or instructions (e.g., software and/or firmware), electronic data, databases, or other digital information and may include processor-usable media. A storage medium may be any available media that can be accessed by a general purpose or special purpose computer. By way of example and not limitation, a storage medium may comprise one or more devices for storing data, including read-only memory (ROM), random access memory (RAM), magnetic disk storage mediums, optical storage mediums, Flash memory devices, and/or other computer-readable mediums for storing information. For example, a software module may reside in RAM memory, Flash memory, ROM memory, EPROM memory, EEPROM memory, registers, a hard disk, a removable disk, a CD-ROM, or any other form of storage medium 140 known in the art. The storage media 140 may be coupled to the processing circuitry 130 such that the processing circuitry 130 can read information from, and write information to, the storage media 140. In the alternative, the storage media 140 may be integral to the processing circuitry 130 comprising a conventional processor.

Processor-usable media may be embodied in any computer program product(s) or article(s) of manufacture, which can contain, store, or maintain programming, data and/or digital information for use by or in connection with an instruction execution system including the processing circuitry 130. For example, suitable processor-usable media may include any one of physical media such as electronic, magnetic, optical, electromagnetic, infrared and/or semiconductor media. Some more specific examples of processor-usable media include, but are not limited to, a portable magnetic computer diskette, such as a floppy diskette, zip disk, hard drive, RAM, ROM, Flash memory, cache memory, and/or other configurations capable of storing programming, data, or other digital information.

The motor control circuit 120 is operably coupled to a load 160, which in turn may be coupled to a movable device 170. For explanation purposes only, load 160 will be referred to herein as a motor 160. Motor 160 may be operably coupled to an output of the motor control circuit 120. By way of example and not limitation, the motor 160 may comprise a reversible DC motor. The motor control circuit 120 may comprise conventional circuitry configured to control a rotational direction of the motor 160 in accordance with one or more received control signals. In one or more embodiments, the motor control circuit 120 may comprise a motor control arrangement in an H-bridge configuration to control the rotational direction of a motor, such as either of the arrangements described in U.S. Pat. No. 7,190,132, entitled "METHOD AND APPARATUS FOR MOTOR CONTROL USING RELAYS," issued on Mar. 13, 2007, and U.S. Pat. No. 8,115,427, entitled "METHODS, SYSTEMS, AND DEVICES FOR A MOTOR CONTROL SYSTEM," issued Feb. 14, 2012, the entire contents and disclosures of both of which are incorporated herein by this reference.

The motor control system 100 may also include a main controller 180 operably coupled to the processing circuitry 130 via a bus 190. The main controller 180 may be any suitable controller and may be configured to, for example only, monitor the state of motor 160 or the movable device 170 driven by motor 160, monitor other aspects related to the control of the movable device 170, and thereby operate the movable device 170 under a defined set of parameters or rules. As illustrated, the main controller 180 may be communicatively coupled to the motor 160 and the movable device 170. The main controller 180 may be further configured to transmit and receive one or more status signals via bus 190 to the processing circuitry 130 related to an operational state or status of the motor 160, the movable device 170, or a combination thereof. For example, a status signal related to an operational state of the movable device 170 may comprise an "alarm" or "fault" status signal, a "service" status signal, or a "moving" status signal. Furthermore, for example only, a status signal related to an operational state of the motor 160 may comprise a "start-up" status signal, a "steady-state" status signal, or an "off" status signal.

In operation, a signal may be communicated to the motor control circuit 120 causing the motor control circuit 120 to energize the motor 160 and provide a current from the power source 150 to the motor 160. The provided current is sensed with the current sensor 110 and a signal proportional to the amount of current sensed with the current sensor 110 is communicated to the processing circuitry 130. The processing circuitry 130 is configured to sample the signal at discrete positions (e.g., positions of the motor 0160 or positions of the movable device 170) or times to obtain a plurality of current values. The processing circuitry 130 is configured to analyze the current values obtained, as well as to compare the values to any previously acquired values and/or to store the values as needed, as will be discussed in further detail hereafter.

In many applications, a load may require varying amounts of current during an operational cycle of the load. In other words, the current provided to the load may vary over the course of a single operational cycle. For example, the motor 160 may require a higher current during a "start-up" mode than what is required during a "steady-state" mode. Furthermore, the motor 160, the movable device 170 or both may encounter several irregularities or other anomalies during an operational cycle causing the current requirements to fluctuate even during the "steady-state" mode. In some applications, certain fluctuations in the current requirements may signify a problem of some sort. For example, when a movable device 170 is stopped or substantially restrained from motion during an operational cycle, the motor 160 may require a substantially higher current as compared to a normal operation of the movable device 170. However, certain fluctuations may also be considered part of a normal operational cycle.

In various embodiments, the motor control system of the present disclosure is configured to monitor the current requirements of a normal operational cycle of a load and to identify normal fluctuations as well as deviations from the normal operational cycle that may occur in subsequent operational cycles. In various embodiments, an operation profile of the required current values over the course of a single operational cycle of the motor 160 may be generated. The operation profile may be employed to generate a threshold profile. During operation, one or more subsequent required current values may be compared to the threshold profile to determine whether any errors or anomalies exist. In one or more embodiments, the processing circuitry 130 may be configured to generate and store an operation profile and to generate a threshold profile therefrom, including updating the operation profiles and threshold profiles, in the manner(s) described in U.S. Pat. No. 8,278,862, entitled "MOTOR CONTROL SYSTEMS, FOLDABLE PARTITIONS EMPLOYING MOTOR CONTROL SYSTEMS, METHODS OF MONITORING THE OPERATION OF ELECTRIC MOTORS AND FOLDABLE PARTITIONS," issued Oct. 2, 2012, the entire contents and disclosure of which is incorporated herein by reference.

Figure 2A:
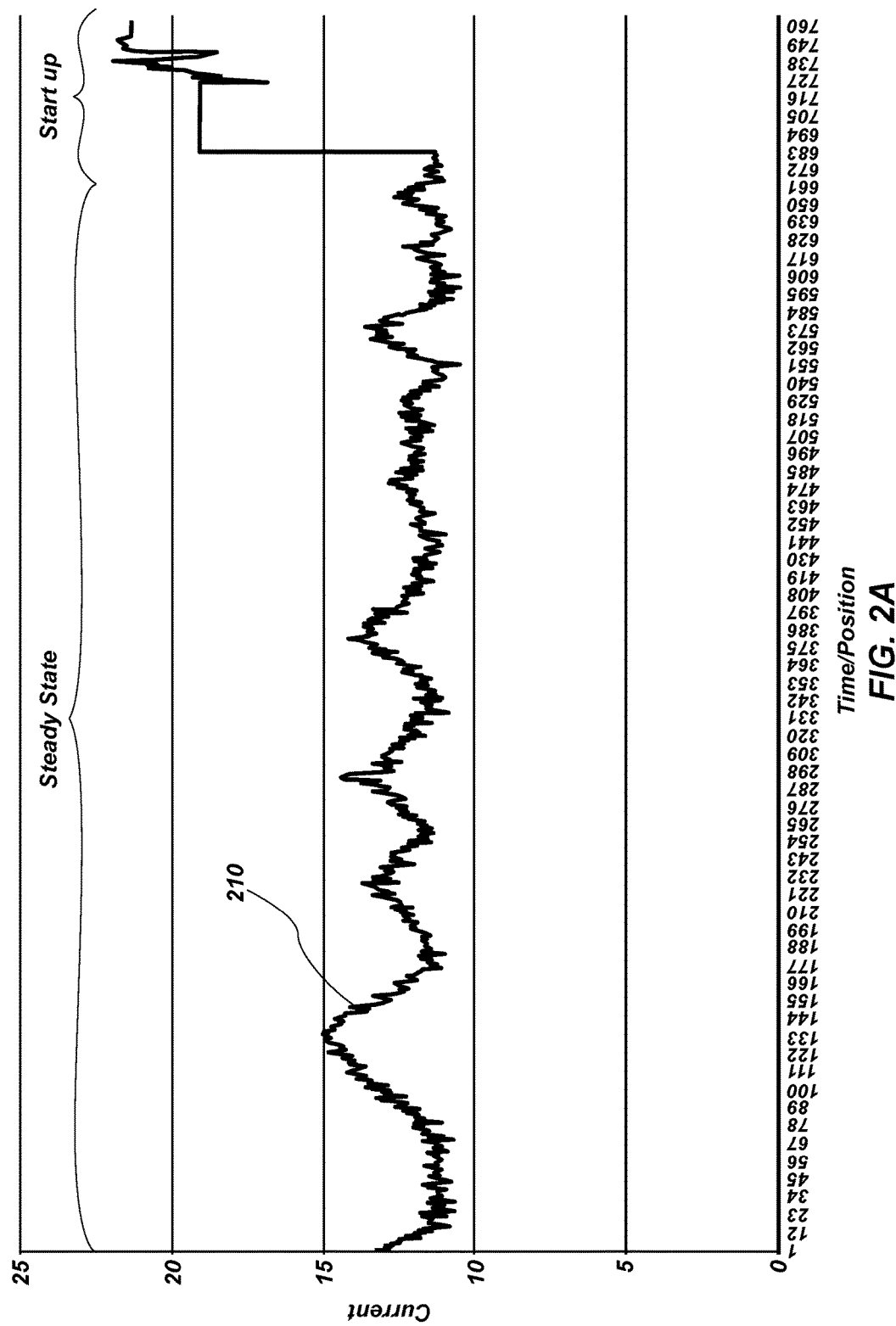
FIG. 2A illustrates an operation profile of the sampled current values of a load through one full operational cycle according to at least one embodiment.

FIG. 2A illustrates an operation profile 210 of the sampled current values for a motor 160 through one full operational cycle according to at least one embodiment. As shown, the current requirements may be greater during a "start-up" mode as indicated on the right-most portion of the graph and may decrease as the motor 160 continues into a "steady-state" mode in which the operation is continuous. As also illustrated in FIG. 2A, the current values through the "steady-state" mode may fluctuate, as indicated by the portion of the graph left of the "start-up" through the end of the operational cycle at the left-most side of the graph.

FIG. 2B illustrates the operation profile 210 of FIG. 2A with the corresponding threshold profile 220 generated therefrom. By way of example and not limitation, an operation profile may be offset by a selected number, such as thirty-five (35) units, and may be averaged using a rolling average of groups of eight (8) consecutive current values to smooth out the curve. In addition, the threshold offset may be a value that varies with time, position, or a combination thereof. As a non-limiting example, the threshold offset may be greater in areas of peak current in the operational profile and lesser in areas of substantially constant current in the operation profile.

Figure 2C:
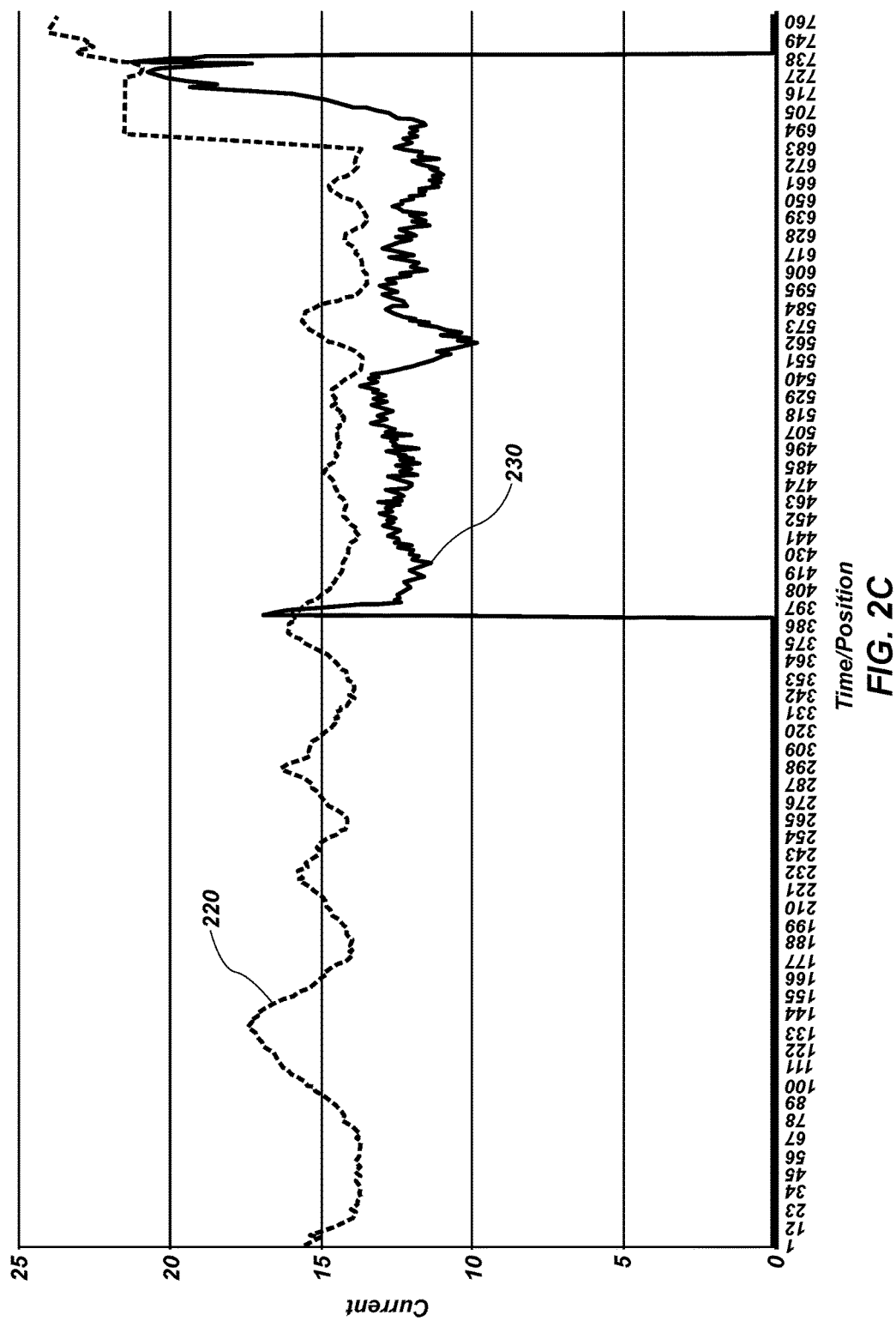
FIG. 2C illustrates an operation profile of a subsequent operational cycle in relation to the threshold profile of FIG. 2B.

FIG. 2C illustrates an operation profile 230 of a subsequent operational cycle in relation to the threshold profile 220. As shown, during the subsequent operational cycle, the current values remain below the threshold profile 220 at the beginning of the operational cycle toward the right side of the profile, indicating normal operation. About midway through the operational cycle, the current spikes to a level above the threshold profile 220. The processing circuitry 130 (FIG. 1) is configured to compare the current values required for the motor 160 (FIG. 1) during the subsequent operational cycle in at least substantially real time. The processing circuitry 130 may stop operation of the motor 160, typically by means of the motor control circuit 120, upon an indication of a substantial variance from normal operating current values, since such a variance may indicate a problem with the normal operation of the motor 160 or the movable device 170 (FIG. 1) (e.g., such as an obstruction). As illustrated in FIG. 2C, the current values drop to about zero after the current went above the current values of the threshold profile 220, indicating that operation of the motor 160 and the movable device 170 ceased.

After an irregularity is detected, the current provided to the motor control circuit 120 may vary from the operation profile as the main controller 180 controls operation of the motor 160 to respond to the detected irregularity during an operational cycle. Various embodiments of the present disclosure are directed to maintaining the detection functionality of the processing circuit 130 in spite of the fluctuating current requirements until a "steady-state" mode is restored or an operational cycle completes.

At least some of the embodiments of the motor control system 100 of the present disclosure are configured to adjust or temporarily update the threshold profile current values for the operational cycle. The processing circuitry 130 is configured to determine and store adjusted values for the threshold profile current values for the operational cycle. According to one embodiment of the disclosure, the processing circuitry 130 is configured to determine a positional range (e.g., distance or time for a load) for which the profile values should be adjusted. The positional range may correspond to a positional range within which the current provided to the motor control circuit 120 may vary from the operation profile. For profile values within the positional range, the processing circuitry 130 may determine adjusted values, in part, based on the expected current requirements for operation of the motor 160 within said range. In one embodiment, the processing circuitry 130 may base the expected current requirements on one or more stored profiles for known non-standard operation cycles. In another embodiment, the processing circuitry 130 may calculate adjusted profiles currents based on threshold profile currents and other operating characteristics that correspond to current requirements such as speed of the motor, required power of the motor, etc.

The processing circuitry 130 is configured to sample the signal generated by the current sensor 110 proportionally to the current provided to the motor 160 during the irregular operational cycles. The processing circuitry 130 is further configured to analyze the current values obtained, and compare them to the one or more adjusted threshold profile currents to determine whether any errors or anomalies exist.

Figure 3:
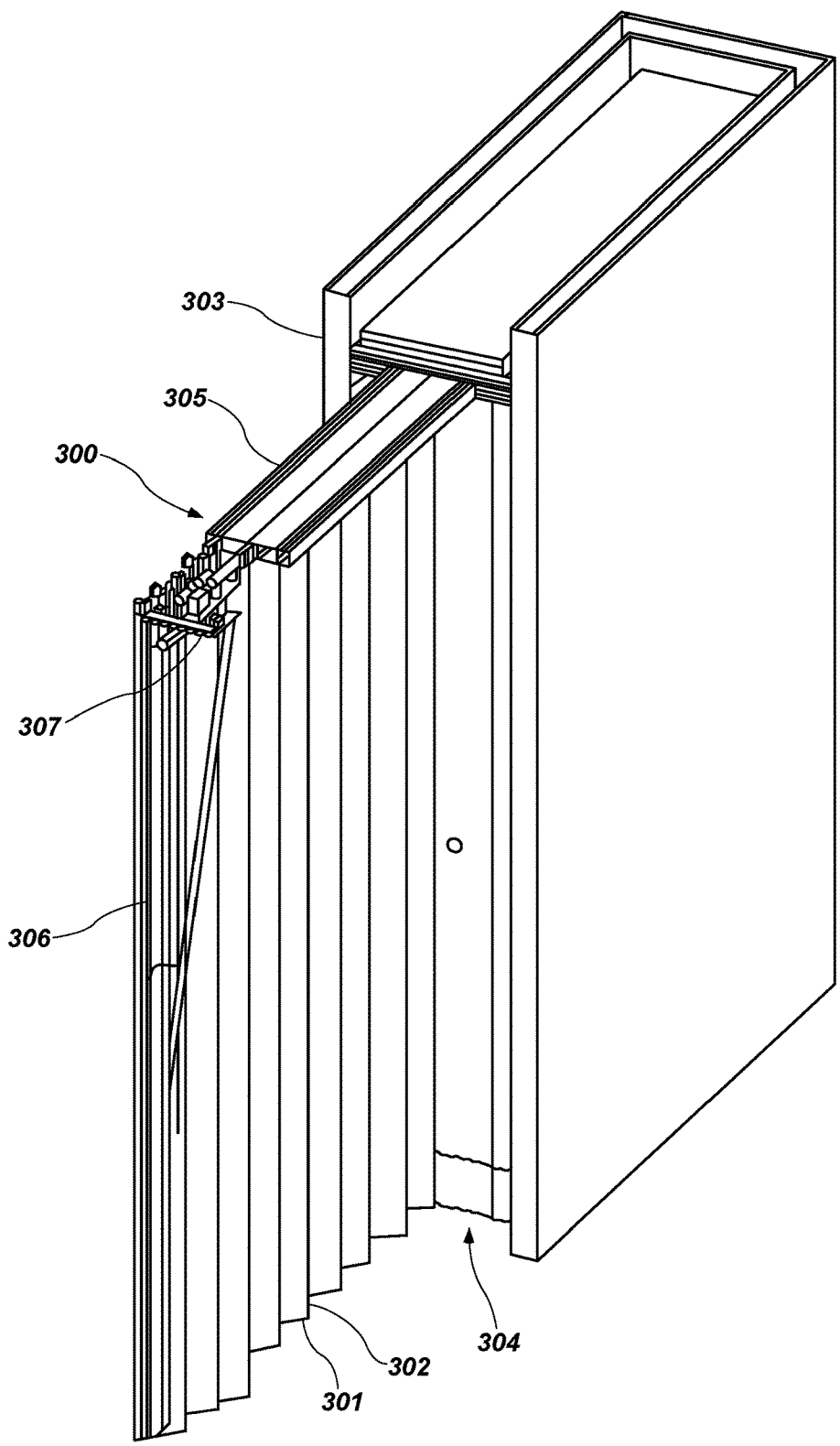
FIG. 3 illustrates a movable device comprising a foldable partition according to at least one embodiment comprising a motor control system of the present disclosure.

Numerous and varying applications employing an electrically controlled motor may employ a motor control system 100 of the present disclosure, as will be appreciated by those of ordinary skill in the art. In at least some embodiments of the present disclosure and by way of a non-limiting example, the movable device 170 may comprise a movable door or a movable folding partition, such as is described in U.S. Pat. No. 6,662,848, entitled "AUTOMATIC DOOR AND METHOD OF OPERATING SAME," issued on Dec. 16, 2003, and U.S. Pat. No. 8,376,020 entitled "FOLDING PARTITIONS AND PARTITION SYSTEMS HAVING ADJOINING PANELS AND RELATED METHODS," issued on Feb. 19, 2013, the entire contents and disclosure of both of which are hereby incorporated by reference. FIG. 3 illustrates a movable device comprising a foldable partition, such as an accordion-type door 300 having an embodiment of a motor control system 100 of the present disclosure. The door 300 comprises a plurality of panels 301 with adjacent panels 301 connected to one another with hinges 302 or other hinge-like members. The hinged connection of the individual panels 301 enables the panels 301 to fold relative to each other in an accordion or a plicated manner such that the door 300 may be compactly stored in a pocket 304 formed in a wall 303 of a building when in a retracted or folded state.

When it is desired to deploy the door 300 to an extended position, for example, to secure an area such as an elevator lobby or other area during a fire, the door 300 is displaced along a track 305 across the space to provide an appropriate barrier. When in a deployed or an extended state, a leading edge of the door 300, shown as a male lead post 306, complementarily or matingly engages with a jamb or door post (not shown) that may be formed in a wall of a building or another door.

A drive, which may include, for example, a motor 160 (FIG. 1) and a conventional transmission member such as a drive belt or chain (not shown), may be configured to open and close the door 300 upon actuation thereof, as is known to those of ordinary skill in the art. A trolley 307 is coupled to a portion of the chain and configured to ride or slide along the track 305. The trolley 307 may be coupled to, for example, the lead post 306 such that displacement of the trolley 307 results in corresponding displacement of the lead post 306 and the panels 301 attached thereto. The door 300 may further comprise a motor control system 100 (FIG. 1) as described above for controlling the operation of the motor 160.

Figure 4A:
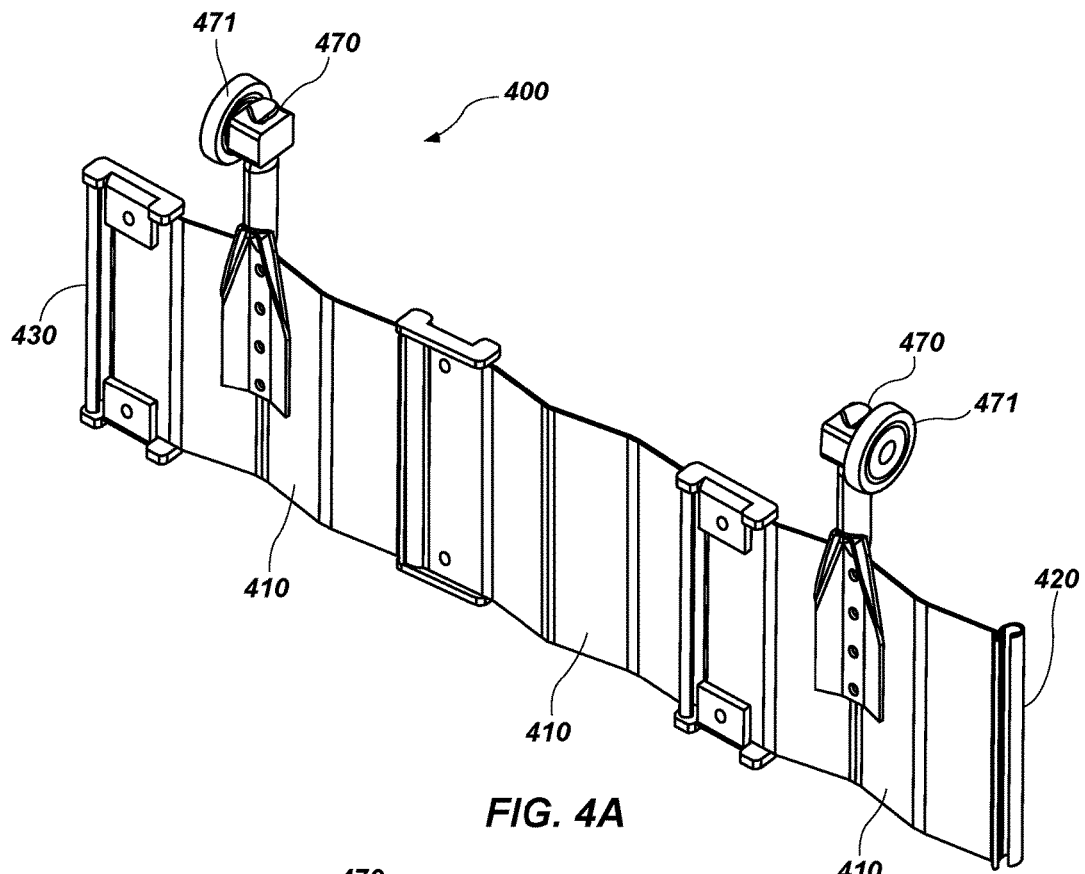
FIGS. 4A and 4B illustrate a movable device comprising a foldable partition according to at least one embodiment of the present disclosure.
Figure 4B:
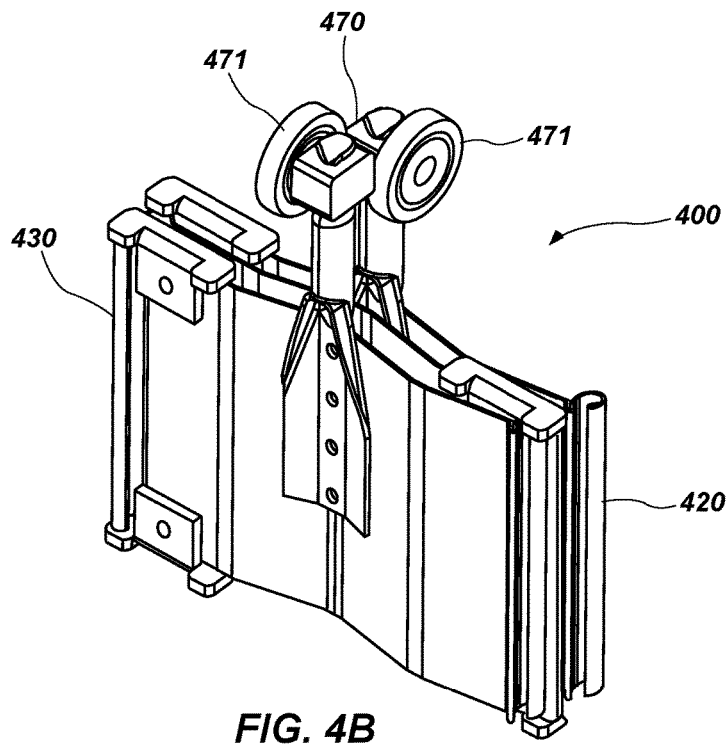

FIGS. 4A and 4B illustrate a movable device comprising a foldable partition, such as an accordion-style door 400 that may be operated by embodiments of the motor control system 100 of the present disclosure. The door 400 comprises a plurality of adjacent sheets of panels 410. The panels of the sheet 410 may be adjoined directly end-to-end, with the region of connection permitting some back-and-forth movement relative to each adjoined and adjacent panel. Sheets of panels 410 may include lateral ends 420 and 430 that are shaped like cylinders with openings such that the opening of the lateral end 420 is configured to receive and engage a lateral end of the shape like lateral end 430. The lateral ends 420 and 430, once engaged, permit some relative motion between the sheets 410.

The engaged lateral ends 420 and 430 enable the panels 410 to fold relative to each other in an accordion or a plicated manner such that the door 400 may be compactly stored in a pocket 440 formed in a wall 450 (FIG. 5) of a building when in a retracted or folded state. When the door 400 is deployed to an extended position, for example, to secure an area during a fire, the door 400 is displaced along a track 460 (FIG. 5) across the space to provide an appropriate barrier. When in a deployed or an extended state, a leading edge of the door 400 complementarily or matingly engages with a jamb or doorpost (not shown) that may be formed in a wall of a building or another door.

Figure 5:
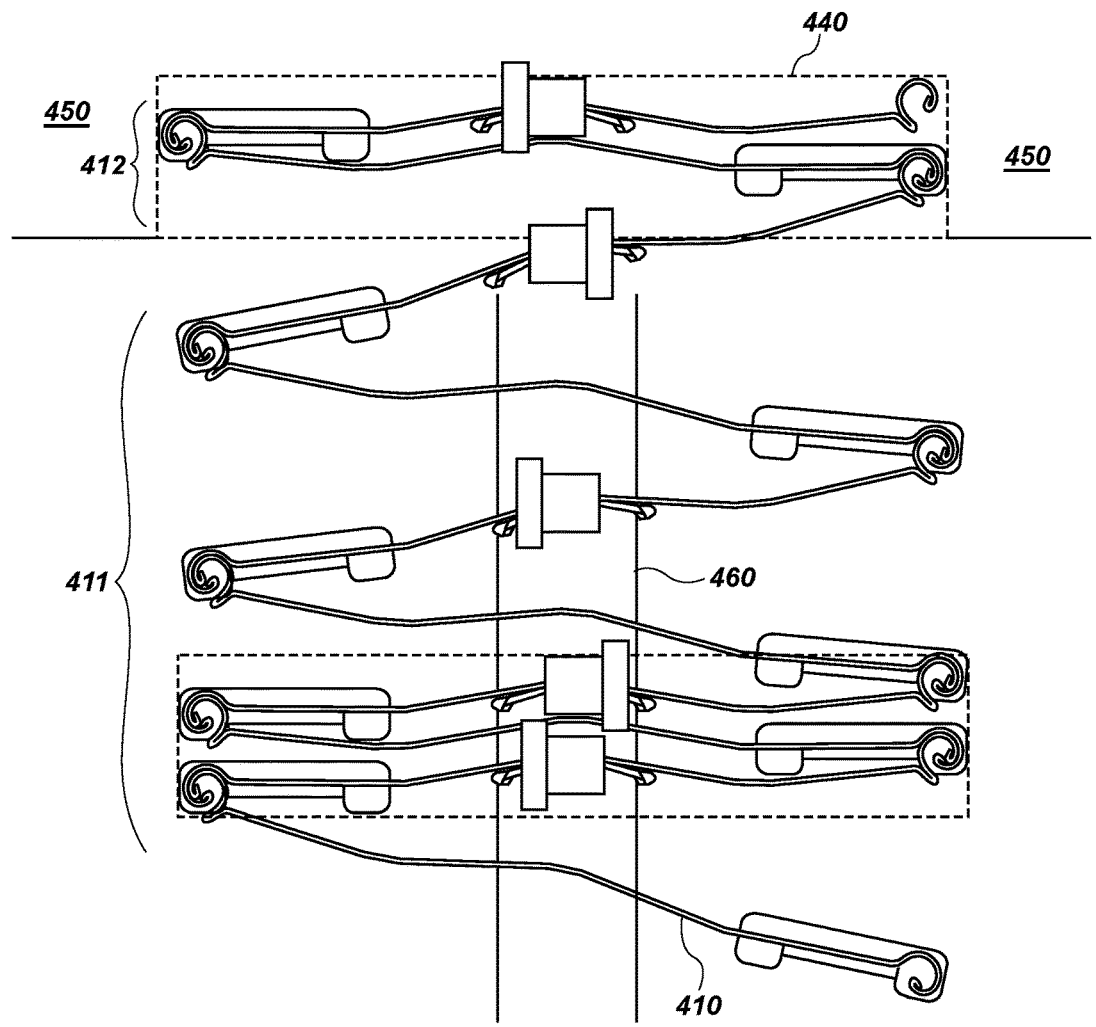
FIG. 5. Illustrates the movable door of FIGS. 4A and 4B and further comprising a motor control system of the present disclosure.

One or more roller assemblies 470 may be fastened to the sheets of the door 400 and engage the track 460 (FIG. 5). The wheels 471 of the roller assemblies 470 may be positioned on alternating sides of the block and pin support members that attach the roller assemblies 470 to the panels 410, as illustrated in FIGS. 4A and 4B, to facilitate compact stacking of the panels. The door 400 may be suspended from the roller assemblies 470 so that the bottom edge is positioned just above or just in contact with the floor.

The motor 160, whether operating door 300 or 400, may require a variable amount of current during operation depending on a number of differing factors. By way of example and not limitation, the required current for the motor 160 may vary depending on whether the motor 160 is initially starting, the number of panels of the door that the motor 160 is displacing at a given time, any irregularities or resistance in the track on which the foldable partition travels, whether the travel of the foldable partition is obstructed, etc.

It has been discovered that when a foldable partition, such as door 300 or door 400, encounters an obstruction, the current supplied to the motor 160 rises to a level substantially higher than normal operating levels. Furthermore, it is typically desirable to configure a foldable partition to stop if the foldable partition encounters an obstruction while closing since such an obstruction may represent a person attempting to escape an area that is on fire or filled with smoke. Therefore, the processing circuitry 130 of the motor control system 100 may be configured to monitor the current requirements for the motor 160 while the door 300 or door 400 is closing, and to stop the door if the current requirements are above a threshold.

As described above, the processing circuitry 130 of the motor control system 100 may be configured to generate a dynamic threshold profile for comparing current requirements of operational cycles of, for example, the door 400. For the door 400, an operational cycle may comprise displacing the door 400 from a fully open position to a fully closed position. As the door 400 is being closed, the current sensor 110 senses the current being supplied to the motor control circuit 120 and communicates a signal comprising a value of the supplied current to the processing circuitry 130. As described above, the processing circuitry 130 is configured to generate and store an operational profile comprising the current values at a plurality of door positions between the fully open and fully closed positions. The processing circuitry 130 is further configured to generate a threshold profile from the initial operation profile for the door 400.

Once the threshold profile is generated and stored, the threshold profile may be updated and refined each time the door 400 is operated through a full cycle (i.e., from fully open to fully closed). Furthermore, the current provided to the motor control circuit 120 may be monitored each time the door 400 operates to determine in substantially real time whether the door 400 has encountered an obstruction by determining whether the current supplied to the motor control circuit 120 exceeds the threshold current for each position of the threshold profile.

If the supplied current exceeds the threshold current at some position of the operational cycle, the motor control system 100 (FIG. 1) may be configured to stop the door 400 (FIGS. 4A, 4B and 5) from advancing further. After the door 400 stops, the motor control system 100 may be configured to back-up the door, hold still the door, or engage in some other response. One or more of the embodiments of the present disclosure may utilize pulse-width-modulation of control signals to the motor 160 to control the speed and direction of the motor 160, for example, as described in U.S. Pat. No. 9,151,103, entitled, "METHODS FOR SPEED CONTROL OF A MOVABLE PARTITION," issued Oct. 6, 2015, and U.S. Pat. No. 8,692,493, entitled "METHODS, APPARATUSES, AND SYSTEMS FOR SPEED CONTROL OF A MOVABLE PARTITION," issued Apr. 8, 2014, the entire contents and disclosure of both of which are incorporated herein by reference.

Embodiments of the method of detection of an obstruction and responding thereto described above was made in reference to the door 400, it would apply to other embodiments of foldable portion doors, including door 300.

Once the response is complete, the motor control system 100 may re-start a door so that it continues closing. There may be some time or position before the door is operating again in accordance with its operational profile. For example, in the case of a foldable partition door like the door 400, as it begins to close the leading edge of the door and the panel immediately behind the leading edge move first. More panels are picked-up and moved until eventually all of the panels are moving that were moving before the obstruction was detected. The point in time when all of the panels that were moving are again moving is called the "Panel Pick-Up Point" or "PPP."

FIG. 5 illustrates a door, such as a door 400, that stopped in response to a detected obstruction. Several panels 412 are still in a folded position in the pocket 440, and the panels 411 between the panels 412 and the lead panel 410 are in varying unfinished states of unfolding to an extended, open position.

Figure 6A:
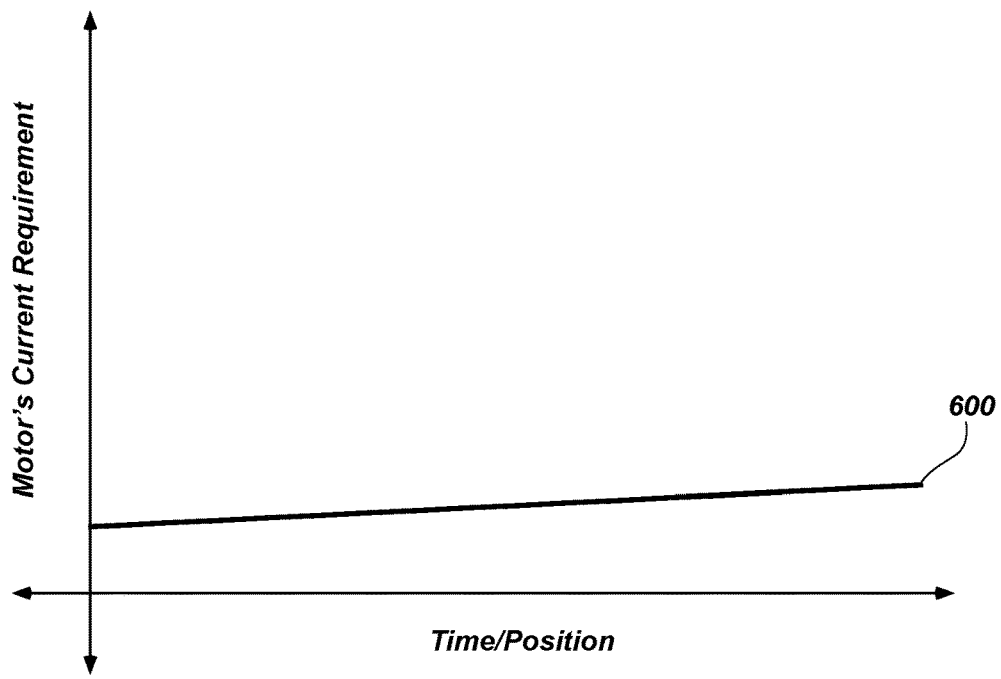
FIG. 6A illustrates a current requirement of a motor of a motor control system operating a movable door comprising a foldable partition according to an exemplary embodiment of the present disclosure.
Figure 6B:
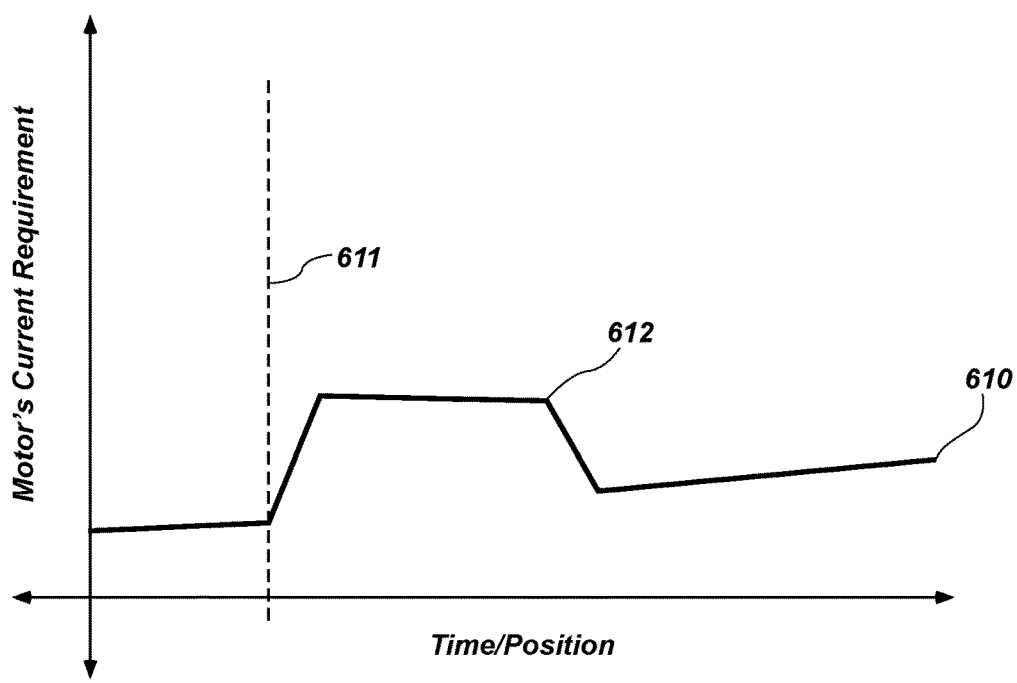
FIG. 6B illustrates a modified current requirement of a motor of a motor control system operating a movable door according to an exemplary embodiment of the present disclosure.

As the lead panel 410 moves and picks up the panels 411, the current requirement of the motor 160 may increase, sometimes substantially, to generate the force to overcome the inertia of the formerly stationary panels. FIG. 6A illustrates a normal current requirement 600 of a motor 160 operating a door 400 (FIGS. 4A, 4B and 5) from closed to open according to an embodiment of the disclosure. FIG. 6B illustrates a modified current requirement 610 after a door 400 begins moving again after responding to an obstruction. At the panel pick-up-point 611, all of the panels 411 (FIG. 5) are moving again and their inertia is being overcome. The modified current requirement 610 increases substantially to increase the power of the motor 160 and generates a force that can overcome the inertia of the panels. Once the inertia has been overcome at 612, the current requirement may resemble the current requirement 600 in FIG. 6A.

Though described in connection with the door 400, various embodiments of the motor 160 may encounter increased current requirements when operating other embodiments of folding partition doors, such as door 300.

The inertia and increase in force needed to move the doors may be more pronounced in the case of a door 400. The current requirement of the motor 160 may also vary depending on the speed of a moving door. Doors that operate at a high-speed (e.g., emergency fire doors) may experience a greater resistive force from the moment of inertia from the panels to be picked up and therefore the current requirement to the motor 160 necessary to generate the force to overcome the inertia may be more than doors that operate at slower speeds. Further, the rate of change of the current requirement may also be higher—e.g., a spike—in a high speed system than for a slower speed system. By way of non-limiting examples, embodiments of the disclosure may operate according to the speed ranges (inclusive of min and max) set forth in Table 1, below:

TABLE 1

| Type | Min Speed (inches per second) | Max Speed (inches per second) |
| --- | --- | --- |
| Standard Speed | 9 | 22 |
| High Speed | 19 | 24 |

Until the inertia of the panels has been overcome, the door 400 may appear to operate irregularly—i.e., not in accordance with the profile for a standard operation cycle. The current supplied to the motor 160 that is sensed by the current sensor 110 and analyzed by the processing circuit 130 may not align with the operation profile, perhaps substantially, and may exceed the relevant threshold profiles. This may cause "false alarms" even if there is in fact, neither an obstruction nor any other hindrance to the operation of the door 400. This may also interfere with the detection of real obstructions or hindrances.

In various embodiments of the present disclosure, the processing circuitry 130 is configured to adjust the threshold profile values after an obstruction has been detected until normal operation has been restored or operation finishes. For example, if the system begins nonstandard operation at position $P_1$ and passes the PPP at position $P_5$, the processing circuitry 130 is configured to adjust the stored threshold profile current values from position $P_1$ to $P_5$ to account for the current requirements of the non-standard operating cycle. After the door 400 reaches, and moves beyond, position $P_5$, a normal operation cycle may be restored and the original, un-adjusted threshold profile current values may be used to monitor the motor and detect errors or irregularities, such as new obstructions.

While some embodiments of the disclosure may directly adjust the stored threshold profile values, in other embodiments of the disclosure, the processing circuitry 130 may be configured to generate adjusted current values for the stored operational profiles and then generate threshold profile current values from the adjusted stored operation profiles.

Figure 7:
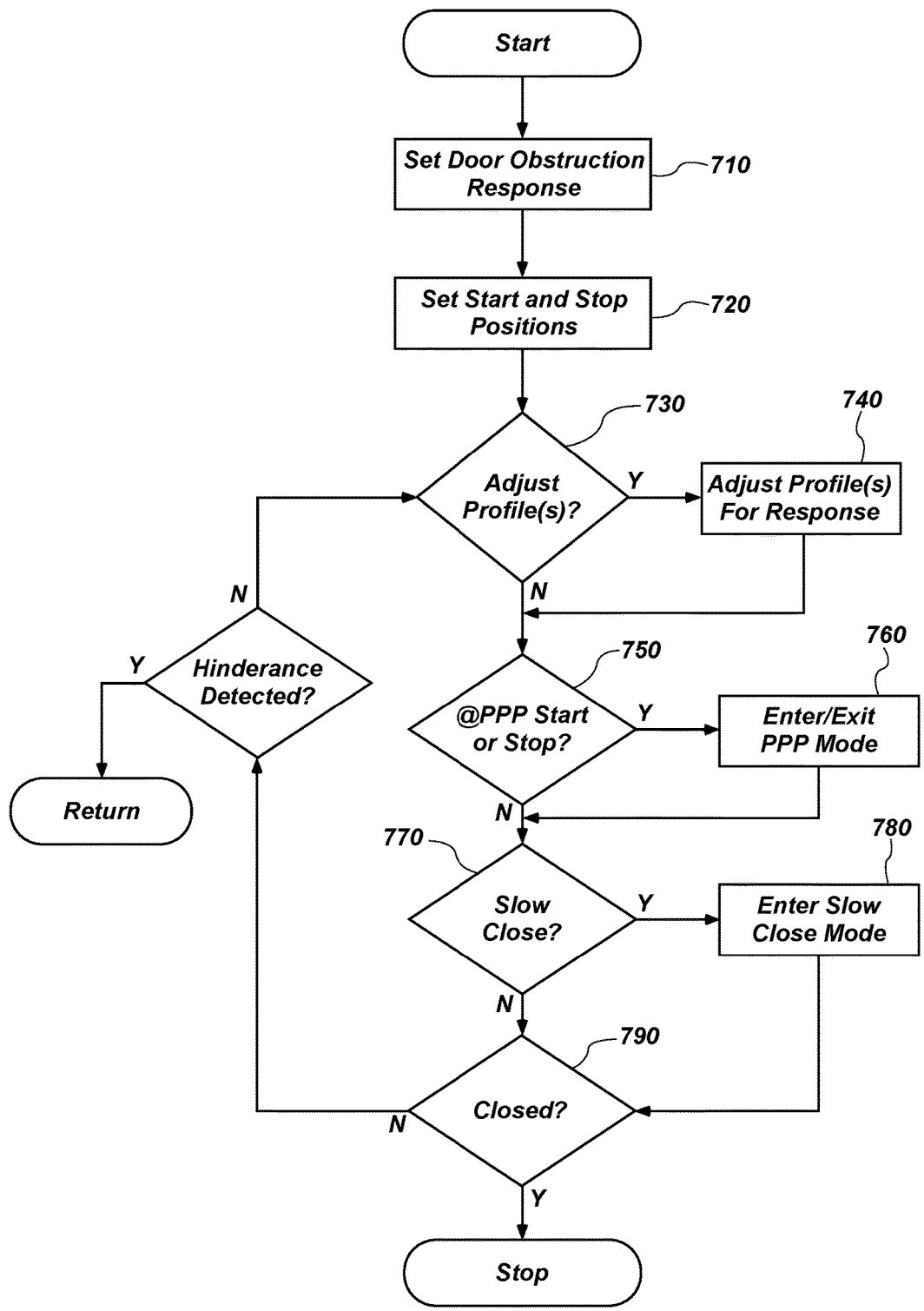
FIG. 7 illustrates a flowchart of at least one embodiment of a method of monitoring for an obstruction of a movable door comprising a foldable partition.

FIG. 7 illustrates a method for controlling a "close" operation of a foldable partition such as door 400 (FIGS. 4A, 4B and 5) that includes adjusting threshold profile current values to account for expected current requirements of the motor control system 100 (FIG. 1), and operating the foldable partition with the adjusted threshold profile values, according to an embodiment of the present disclosure.

An obstruction response procedure is set and stored in operation 710. The door 400 may be operated in response to an obstruction. For example, the control system 100 may pause the door or back up the door, including retracting the door back into a fully open position. The control system 100 may use combinations of pause, retract, and advance, as well as vary the speed of the door 400. In one embodiment, the motor control system 100 may detect a type of obstruction, and based on one or more of the type, position, and speed, and combinations thereof, determine and set a response. In one embodiment, the control system 100 may utilize a test procedure to detect a type of obstruction and/or set a response.

A "start" position and a "stop" position are determined and set in operation 720. The start and stop positions may define a range of positions of the door 400 for which the current requirements of the door 400 may be irregular because it is operating in response to an obstruction. The start and stop positions may be set based on one or more of a current position of the door, features of the door, the speed(s) of the door, and the obstruction response. The start position and the current position may be substantially the same, but they may also be offset, for example, if the door 400 retracts in response to the obstruction.

Figure 8:
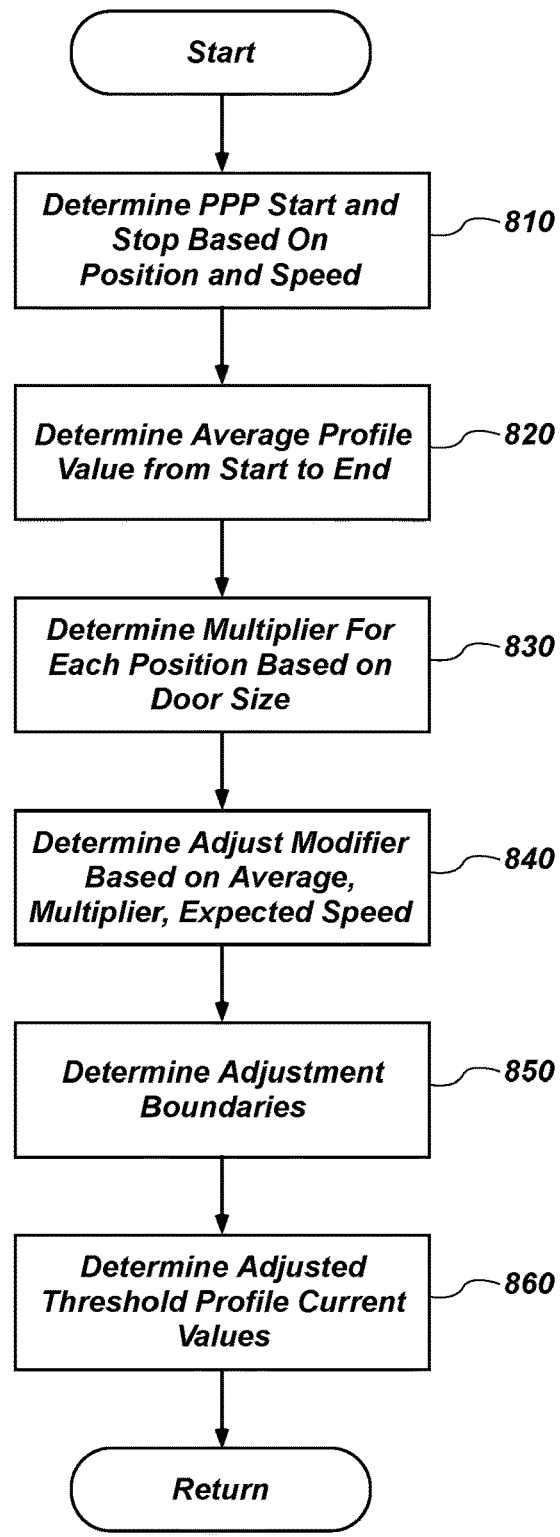
FIG. 8 illustrates a flowchart of at least one embodiment of a method of adjusting a current requirement profile of a motor of a motor control system operating a movable door comprising a foldable partition.

A determination is made whether adjustments should be made to the threshold profile currents in operation 730. In one embodiment, if a PPP has been triggered then an adjustment to the threshold profile currents is also triggered. If the determination is made to adjust the profiles, then an adjustment routine is initiated in operation 740, pursuant to which the profiles are adjusted. An adjustment routine according to an embodiment of the present disclosure is illustrated in FIG. 8 and described in the supporting text. Operation 740 of FIG. 7 includes as parameters an operation response parameter (such as an identifier), and a PPP parameter. As already noted, the force necessary to operate a movable foldable partition-type door smoothly during a restart cycle, including while picking up panels, may increase substantially over a standard operating cycle. Thus, the current requirement of the motor controlling operation of the door, such as the motor 160, may increase substantially. Further, the speed of operation while in PPP mode may be different than high speed or standard speed. By way of one non-limiting example, in some embodiments the speed of the door while in PPP mode is between 7 to 10 inches per second, inclusive. Thus, in this embodiment, profile adjustment takes into account a PPP mode of operation. Different parameters may be used in other embodiments where the door 400 is not a foldable partition.

A determination is made whether to start or stop a PPP mode based on the position of the door 400 in operation 750. If the door 400 has entered the PPP range of operation for the first time, then the operating mode is set to PPP Mode in operation 760. In the PPP Mode, the operational cycle of the motor 160 is such that it is has higher current requirements than in a standard operating cycle in order to account for the resistance from the inertia of the panels. The processing circuitry 130 is configured to use the adjusted threshold profile current values to detect unusual current requirements in order to take into account that the motor 160 is operating in the PPP mode. If there is no panel pick-up expected in the door obstruction response, then there will be no PPP start or stop in operation 750, and PPP mode will not be entered.

A determination is made whether, based on the position of the door 400, to enter a slow close mode in operation 770. The position that triggers slow mode may be programmed based on the length of the door—i.e., long doors will enter slow close mode at a position farther from the close than short doors. If the determination is made to enter slow close mode, then the operating mode is set to slow close mode in operation 780. By way of one non-limiting example, in some embodiments the speed of the door during slow close mode is 7 to 10 inches per second, inclusive. Those of ordinary skill in the art will understand that more than one operating mode may set at a time, and that the operation cycle for a mode may be adjusted based on another operating mode that is also set.

A determination is made whether the door is closed in operation 790. If the door is closed then the operating cycle is complete. If the door is not closed, a determination is made whether any irregularities or errors have been detected by the processing circuit 130. The processing circuit 130 is configured to continue to monitor the current requirements of the motor 160 and detect variations from the adjusted threshold profile current values determined in operations 730 and 740. In one embodiment of the present disclosure, a flag is set if an adjusted threshold profile current value is exceeded, and the processing circuit 130 detects the flag is set in operation 790. In another embodiment of the present disclosure, if an adjusted threshold profile current value is exceeded, a system level interrupt is generated and detected by the processing circuit 130, and, in that sense, hindrance or obstruction detection may be thought of as continuous and in parallel to the operation of the motor 160 and door 400.

FIG. 8 illustrates a method for adjusting threshold profile current values according to an embodiment of the present disclosure.

A "start" position and a "stop" position are set in operation 810. These positions may be known from operation 720 (FIG. 7), or may be determined using the method described above in connection with operation 720.

An average profile value is determined from the start position to the end position in operation 820. In one embodiment, a plurality of threshold profile values may have been stored for a plurality of positions of the door 400 between fully open and fully close, and the average may be determined from these stored values.

A multiplier is determined for each position corresponding to a stored threshold profile value based on one or more of door size and number of door panels being pulled at that position, in operation 830. As one non-limiting example, Equation 1 may be used:

multiplier=MAX(20,(2*door size)/position)    (Eq. 1)

An adjustment modifier based on the average, multiplier, position, and expected speed of the door 400 is determined in operation 840. As one non-limiting example, Equation 2a and 2b may be used:

adjust mod=avg*mult/12(high speed)    (Eq. 2a)

adjust mod=avg*mult/16(normal)    (Eq. 2b)

Boundaries may be set to the profile adjustment in operation 850. For example, the maximum adjustment may be set to 40,000 if there are inherent limits on the circuitry and thus the measured current values.

Adjusted threshold profile current values may be determined and set based on the stored profile values, the adjustment modifier, speed of the door 400, and boundary conditions in operation 860. As one non-limiting example, Equations 3a and 3b may be used:

adjust=MAX(profile*2,adjust mod)(high speed)    (Eq. 3a)

adjust=MAX(profile*1.5,adjust mod)(high speed)    (Eq. 3b)

Those of ordinary skill in the art will appreciate that the plurality of positions may relate to a distance the door 400 has traveled, an amount of time the door 400 has traveled, as well as one of a plurality of positions (i.e., the entire distance may be broken up into 512 equal positions). In various embodiments, the number of positions will depend on the length of the door when closed, and for one embodiment a door 400 installed in a commercial building the number of positions may range from 512 positions to 1,023 positions, inclusive.

While the above method of adjusting profiles was described in connection with a position range between a "start" and a "stop," one of ordinary skill in the art will appreciate that multiple ranges may be defined and the associated profile values within adjusted. In that sense, the door may be thought of as operating back and forth between a normal and an exceptional state.

Although each exemplary operation illustrated in the drawings and accompanying text recites steps performed in a particular order, the present invention does not necessarily need to operate in that recited order. One of ordinary skill in the art would recognize many variations, including performing steps in a different order.

Further, while certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Indeed, the features of the various embodiments described herein are not mutually exclusive and can exist in various combinations and permutations, even if such combinations or permutations have not been expressly described. Thus, the scope of the invention is only limited by the literal language, and legal equivalents, of the claims that follow.

What is claimed is:

1. A method of profiling a current requirement of an electric motor, the method comprising:
   selecting sample points on a current profile, the sample points corresponding to positions of a folding partition during an operational mode of the electric motor;
   averaging current values for the plurality of sample points;
   determining a current multiplier for each of the sample points based on an expected load of the electric motor at a corresponding position of the folding partition;
   determining a modifier for each of the plurality of sample points based on at least the current multipliers and the average current value; and
   adjusting the current values for the plurality of sample points based on the modifiers.

2. The method of profiling a current requirement of an electric motor of claim 1, further comprising determining adjustment boundaries for each sample point.

3. The method of profiling a current requirement of an electric motor of claim 2, wherein the adjustment boundaries are based on one or more operational limits of the electric motor.

4. The method of profiling a current requirement of an electric motor of claim 1, wherein the current profile corresponds to one or more operational modes of the electric motor.

5. The method of profiling a current requirement of an electric motor of claim 4, wherein the one or more operational modes of the electric motor comprise a normal operational mode, an abnormal operational mode, and a transitionary operational mode.

6. The method of profiling a current requirement of an electric motor of claim 5, wherein the selected sample points on the current profile are associated with the transitionary operational mode.

7. The method of profiling a current requirement of an electric motor of claim 1, further comprising storing the adjusted current values for the plurality of sample points at a non-transitory machine readable medium.

8. The method of profiling a current requirement of an electric motor of claim 1, wherein the current profile comprises current requirements of the electric motor at positions of the folding partition.

9. The method of profiling a current requirement of an electric motor of claim 8, wherein the positions correspond to positions of the folding partition while moved by the electric motor.

10. An electric motor current requirement profiling system, the system comprising:
a processor; and
a non-transitory memory having stored thereon one or more executable instructions that, while executed by the processor, are configured to enable the processor to:
select sample points on a current profile, the sample points corresponding to positions of a folding partition during an operational mode of the electric motor;
average current values for the plurality of sample points;
determine a current multiplier for each of the sample points based on an expected load of the electric motor at a corresponding position of the folding partition;
determine a modifier for each of the plurality of sample points based on at least the current multipliers and the average current value; and
adjust the current values for the plurality of sample points based on the modifiers.

11. The system of claim 10, further comprising determining adjustment boundaries for each sample point.

12. The system of claim 11, wherein the adjustment boundaries are based on one or more operational limits of the electric motor.

13. The system of claim 10, wherein the current profile corresponds to one or more operational modes of the electric motor.

14. The system of claim 13, wherein the one or more operational modes of the electric motor comprise a normal operational mode, an abnormal operational mode, and a transitionary operational mode.

15. The system of claim 14, wherein the selected sample points on the current profile are associated with the transitionary operational mode.

16. The system of claim 10, further comprising storing the adjusted current values for the plurality of sample points at a non-transitory machine readable medium.

17. The system of claim 10, wherein the current profile comprises current requirements of the electric motor at positions of the folding partition.

18. The system of claim 17, wherein the positions correspond to positions of the folding partition while moved by the electric motor.

* * * * *